United States Patent
Kim

(10) Patent No.: US 12,018,788 B2
(45) Date of Patent: Jun. 25, 2024

(54) COUPLER CAP AND QUICK COUPLER HAVING THE SAME

(71) Applicant: HOSAN TECH CO., LTD., Anseong-si (KR)

(72) Inventor: Tae Hyeong Kim, Anseong-si (KR)

(73) Assignee: HOSAN TECH CO., LTD., Anseong-si (KR)

(*) Notice: Subject to any disclaimer, the term of this patent is extended or adjusted under 35 U.S.C. 154(b) by 477 days.

(21) Appl. No.: 17/344,419

(22) Filed: Jun. 10, 2021

(65) Prior Publication Data
US 2022/0341529 A1 Oct. 27, 2022

(30) Foreign Application Priority Data
Apr. 22, 2021 (KR) .................. 10-2021-0052087

(51) Int. Cl.
*F16L 37/138* (2006.01)
*F16L 55/115* (2006.01)

(52) U.S. Cl.
CPC .......... *F16L 55/1157* (2013.01); *F16L 37/138* (2013.01)

(58) Field of Classification Search
CPC ............... F16L 37/138; F16L 55/1157
See application file for complete search history.

(56) References Cited

U.S. PATENT DOCUMENTS

| | | | | |
|---|---|---|---|---|
| 2,512,041 A * | 6/1950 | Steele | ............... | F16L 55/1286 220/236 |
| 3,672,403 A * | 6/1972 | Wilson | ............... | F16L 55/1157 220/315 |
| 4,254,801 A * | 3/1981 | Gerthoffer | ......... | F16L 55/1157 285/918 |
| 4,809,751 A * | 3/1989 | McKenzie | ......... | F16L 55/1286 138/90 |

FOREIGN PATENT DOCUMENTS

| | | | |
|---|---|---|---|
| GB | 690153 A | * | 4/1953 |
| JP | 2000240886 A | | 9/2000 |
| JP | 2000337583 A | | 12/2000 |
| JP | 2004092843 A | | 3/2004 |
| JP | 2007024227 A | | 2/2007 |
| KR | 20-0393535 Y1 | | 8/2005 |
| KR | 10-1894482 B1 | | 9/2018 |

* cited by examiner

*Primary Examiner* — Zachary T Dragicevich
*Assistant Examiner* — James A Linford
(74) *Attorney, Agent, or Firm* — NKL LAW; Jae Youn Kim

(57) ABSTRACT

Provided are a coupler cap and a quick coupler having the same, which can improve coupling power when the cap is coupled with the male coupler and maintain the coupled state with no gap so as to protect the coupler more perfectly. The coupler cap includes: a cap body having one side, which is opened and has a receiving hole so that a male coupler is inserted into the cap body in an axial direction, and the other side, which is closed; a handle connected to the cap body to be rotatable in a radial direction as an axial line; and a stopper moved rectilinearly in the radial direction of the cap body by rotation of the handle.

8 Claims, 12 Drawing Sheets

COUPLER CAP AND QUICK COUPLER HAVING THE SAME

CROSS-REFERENCES TO RELATED APPLICATIONS

This application claims priority to and the benefit of Korean Patent Application No. 10-2021-0052087, filed on Apr. 22, 2021, the disclosure of which is incorporated herein by reference in its entirety.

BACKGROUND OF THE INVENTION

Field of the Invention

The present invention relates to a quick coupler, and more particularly, to a coupler cap for protecting a quick coupler, which couples and decouples end portions of two tubes with or from each other, from external shock, and a quick coupler having the same.

Background Art

In general, quick couplers are means for coupling and decoupling tube-type members, such as hoses or pipes, with or from each other without using any assembly tool, and have been used in various industrial fields. Especially, in a semiconductor manufacturing factory, chemicals of various kinds are loaded and conveyed in a tank truck, and are unloaded into a storage tank in the factory. In this instance, the quick couplers are used for such unloading work.

Such a quick coupler includes a female coupler and a male coupler. When a worker pulls back a sleeve of the female coupler, inserts the male coupler into the female coupler and releases the sleeve, the sleeve moves forwards by an elastic restoring force so as to lock the coupled state between the female coupler and the male coupler. In this instance, locking and release between the female coupler and the male coupler are carried out by a locking means like a ball which is changed in a locked state depending on forward or backward movement of the sleeve. When the male coupler is inserted into the female coupler, plungers of the female coupler and the male coupler push each other so that internal passages communicate with each other.

In order to prevent foreign matters from being attached to the surface of the quick coupler and protect the quick coupler from external shock during handling, a cap is covered on the male coupler when a hose is loaded or conveyed. Especially, because chemicals used in semiconductor manufacturing factories may be deadly to human bodies when an accident occurs owing to lots of toxic substances such as acid or alkaline materials, in order to prevent leakage of chemicals and prevent pollution of the chemicals by foreign matters, the cap is essentially required.

Conventional coupler caps have several problems to be improved. First, the conventional coupler caps are not easily coupled with and decoupled from the male coupler and need the worker's great strength. Second, the conventional coupler caps have a limitation in improving coupling power with the male coupler and are difficult to maintain the coupled state with no gap. Third, the conventional coupler caps are deteriorated in durability since being deformed or worn out when being used for a long period of time. Fourth, the conventional coupler caps are low in sealability and are rapidly degraded in sealability for a long period of time.

PATENT LITERATURE

Patent Documents

Korean Patent No. 10-1894482 (Aug. 28, 2018)

SUMMARY OF THE INVENTION

Accordingly, the present invention has been made to solve the above-mentioned problems occurring in the prior arts, and it is an object of the present invention to provide a coupler cap and a quick coupler having the same, which does not need a worker's great strength and is easy to be coupled to and decoupled from a male coupler.

It is another object of the present invention to provide a coupler cap and a quick coupler having the same, which can improve coupling power when the cap is coupled with the male coupler and maintain the coupled state with no gap so as to protect the coupler more perfectly.

It is a further object of the present invention to provide a coupler cap and a quick coupler having the same, which can improve durability and secure sealability by minimizing deformation or abrasion when being used for a long period of time.

To accomplish the above object, according to the present invention, there is provided a coupler cap including: a cap body having one side, which is opened and has a receiving hole so that a male coupler is inserted into the cap body in an axial direction, and the other side, which is closed; a handle coupled to the cap body to be rotatable in a radial direction as an axial line; and a stopper moved rectilinearly in the radial direction of the cap body by rotation of the handle, wherein the stopper is joined to a coupling groove formed inwardly on the outer circumferential surface of the male coupler by the rotation of the handle in the state where the male coupler is inserted into the cap body, so as to lock the male coupler in the axial direction relative to the cap body.

Moreover, the stopper has a protrusion part formed at an end portion thereof, and coupling between the cap body and the male coupler is maintained by shearing force acting in the axial direction of the cap body in the state where the protrusion part is perfectly inserted into the coupling groove.

Furthermore, the coupling groove extends along the outer circumferential surface of the male coupler, and the stopper and the handle are formed singly.

Additionally, an insert hole which penetrates through the receiving hole in the radial direction is formed in the cap body, and the handle is inserted into the insert hole to be rotatable in place, and a screw bar of which one side is joined to the stopper and which has a screw thread formed on the outer circumferential surface is screw-coupled with the handle.

In addition, a ring-shaped groove is inwardly formed on the inner circumferential surface of the cap body, and the stopper is inserted into the ring-shaped groove, and the stopper is prevented from rotation by the ring-shaped groove and is guided in rectilinear movement when the handle is rotated.

Moreover, a pair of pins are disposed at both sides of the handle and extend at right angles relative to the axial direction to rotatably support the handle.

Furthermore, the pins are arranged between the outer circumferential surface of the handle and the inner circumferential surface of the insert hole, a retaining groove is formed on the outer circumferential surface of the handle to be rotatably supported by the pins, and the pins are biased toward the handle rather than the cap body so that the axial line is located inside the retaining groove.

Additionally, the protrusion part is formed to be inclined at both sides to get narrower toward the end portion, and the coupling groove of the male coupler is formed to correspond to the shape of the protrusion part to get in contact with the protrusion part.

In addition, the handle has a stop part, which restricts a rectilinear movement width of the screw bar by getting in contact with the end portion of the screw bar.

Moreover, an O-ring for sealing between the male coupler and the cap body is disposed between the outer circumferential surface of the male coupler and the inner circumferential surface of the receiving hole.

In another aspect of the present invention, there is provided a quick coupler which includes a female coupler having a locking means changed in a locked state depending on forward or backward movement of a sleeve and a male coupler having a coupling groove inwardly formed on the outer circumferential surface thereof so that the locking means is joined, wherein the male coupler has a coupler cap. The coupler cap includes: a cap body having one side, which is opened and has a receiving hole so that a male coupler is inserted into the cap body in an axial direction, and the other side, which is closed; a handle connected to the cap body to be rotatable in a radial direction as an axial line; and a stopper moved rectilinearly in the radial direction of the cap body by rotation of the handle, wherein the stopper is joined to a coupling groove of the male coupler by the rotation of the handle in the state where the male coupler is inserted into the cap body, so as to lock the male coupler in the axial direction relative to the cap body.

The coupler cap and the quick coupler according to the present invention can make it easy for the coupler cap to be easily coupled with and decoupled from the male coupler, reduce the number of components, lower manufacturing costs, and improve assemblability.

Moreover, the coupler cap and the quick coupler according to the present invention can enhance coupling power between the male coupler and the coupler cap with highly structural intensity despite the reduction in the number of the components, protect the coupler more perfectly since maintaining the coupled state with no gap, and prevent separation of the coupler cap by keeping the stable coupled state.

Furthermore, the coupler cap and the quick coupler according to the present invention can improve durability and secure sealability since minimizing deformation or abrasion when being used for a long period of time, thereby preventing pollution of the coupler.

Additionally, the coupler cap and the quick coupler according to the present invention can provide stable and high coupling force utilizing the coupling groove of the male coupler, which is used for coupling with the female coupler, without using additional coupling means for coupling the coupler cap.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
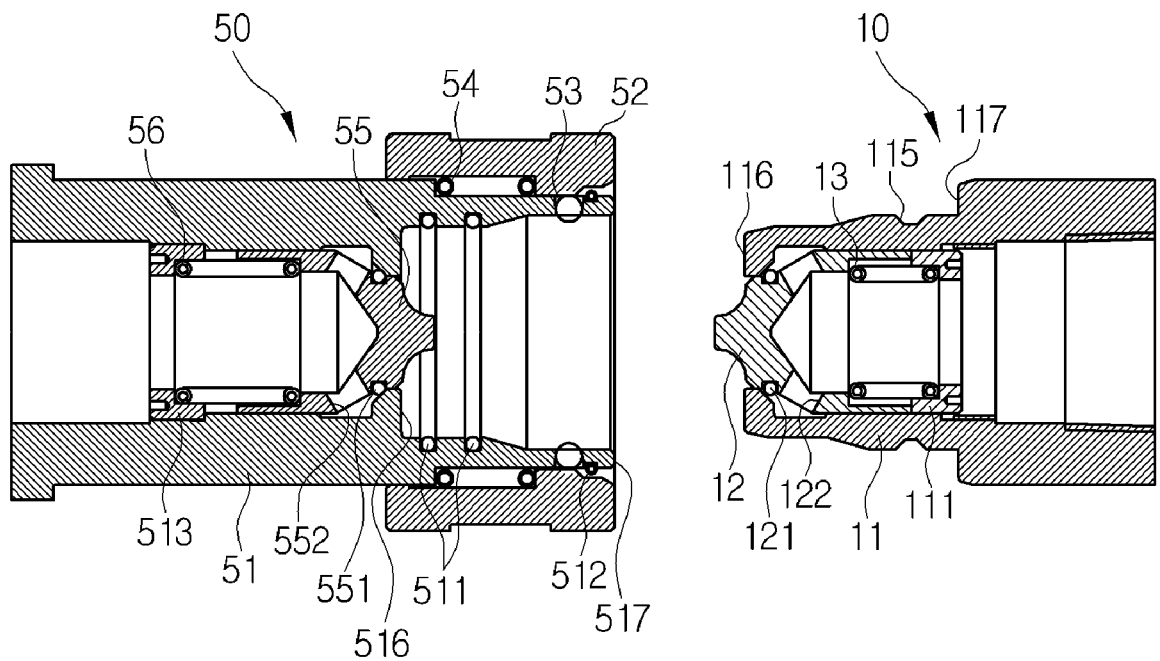
FIG. 1 is a sectional view showing a quick coupler according to a preferred embodiment of the present invention.
Figure 9:
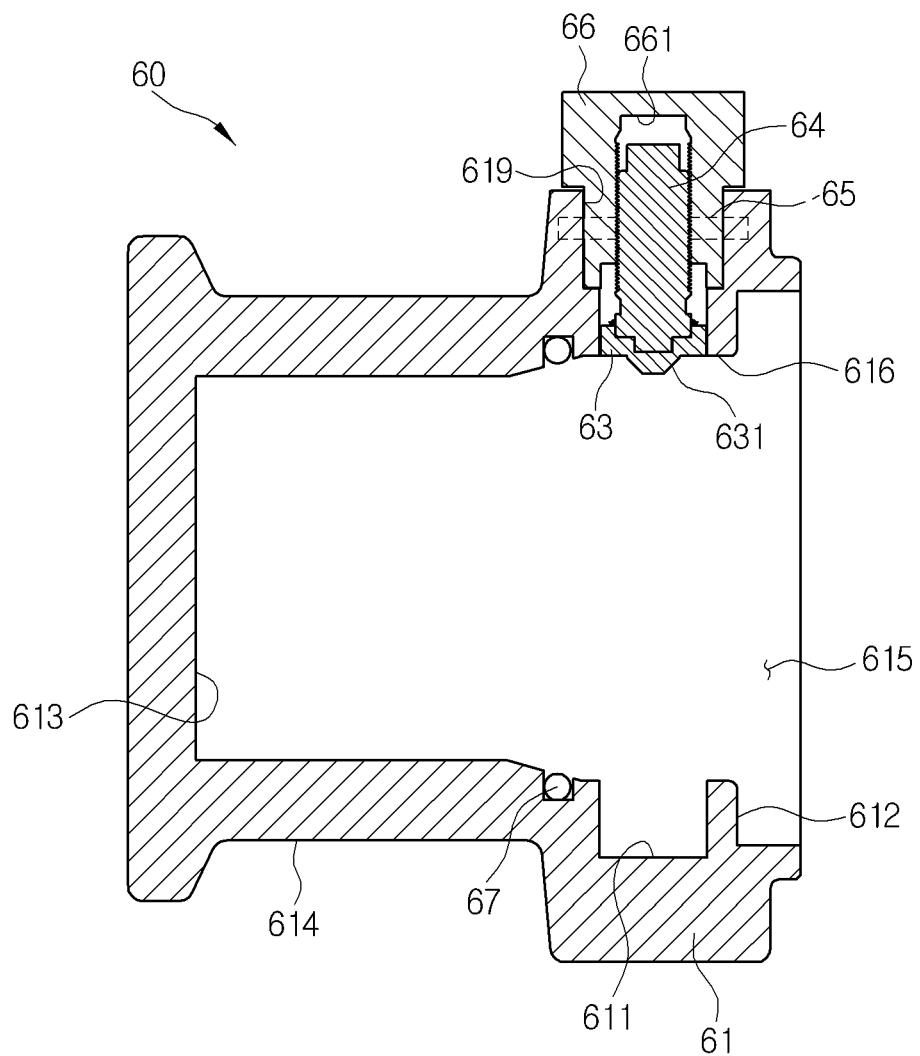
FIG. 9 is a sectional view taken along the line of A-A of FIG. 7.
Figure 10:
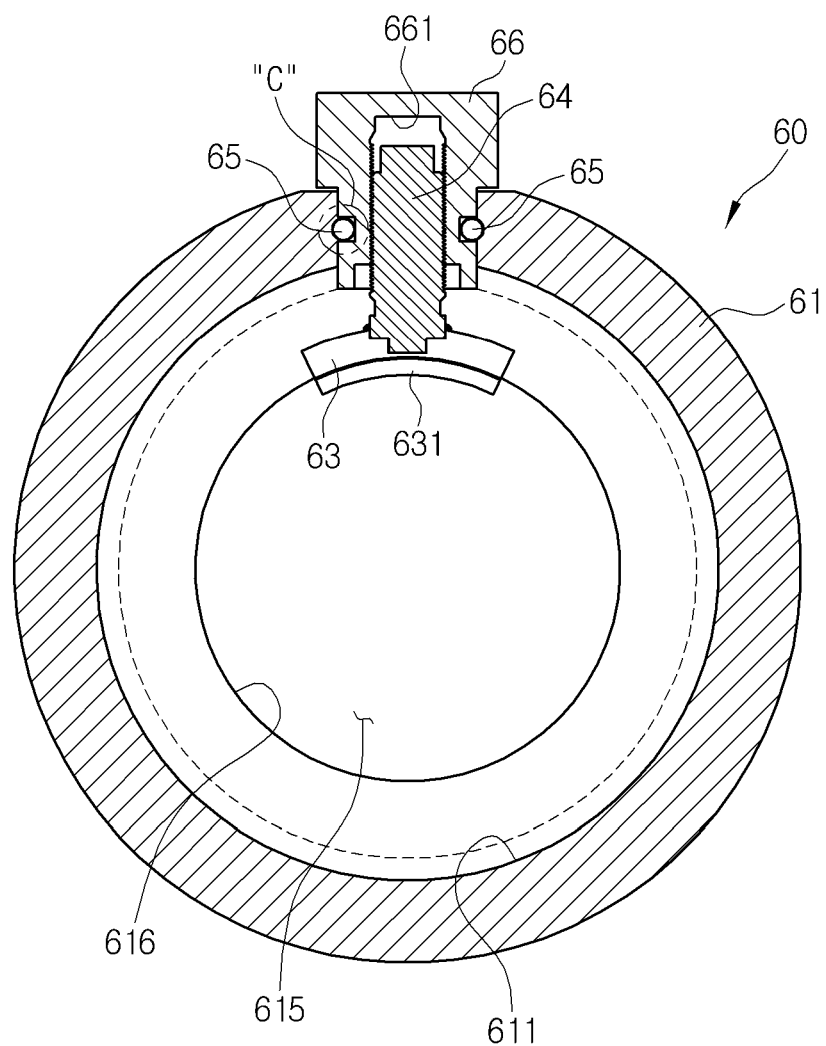
FIG. 10 is a sectional view taken along the line of B-B of FIG. 7.

Hereinafter, a coupler cap and a quick coupler having the same according to preferred embodiments of the present invention will be described in detail with reference to the accompanying drawings. In the following description, the horizontal direction in FIG. 1 is an axial direction of the coupler, and the vertical direction in FIG. 1 is a radial direction of the coupler. Moreover, the horizontal direction in FIG. 9 is an axial direction of a cap body or a radial direction of a handle, and the vertical direction is a radial direction of the cap body or an axial direction of the handle.

Referring to FIG. 1, the quick coupler according to a preferred embodiment of the present invention is to couple and decouple a female coupler 50 and a male coupler 10 with each other and from each other. The quick coupler may be used to a pipeline, which unloads chemicals loaded in a tank truck into a storage tank of a semiconductor manufacturing factory.

The female coupler 50 includes a female coupler body 51, a sleeve 52, balls 53, and a first plunger 55. Moreover, the male coupler 10 includes a male coupler body 11 and a second plunger 12. Additionally, the female coupler 50 has a locking means which is changed in a locked state depending on forward or backward movement of the sleeve. In this instance, the locking means may be a plurality of balls 53. The male coupler 10 has a coupling groove 115 inwardly formed on the outer circumferential surface thereof so that the balls 53 are joined to the male coupler 10.

The sleeve 52 is disposed on the outside of the female coupler body 51 to be slidable in an axial direction within a predetermined range. A first elastic member 54 is disposed between the sleeve 52 and the female coupler body 51. The first elastic member 54 may be a compression spring, and provides elastic force so that the sleeve 52 moves forwards in the axial direction relative to the female coupler body 51. In this instance, the forward movement direction of the sleeve is the right direction of FIG. 1. An O-ring 512 is disposed between the sleeve 52 and the female coupler body 51.

The first plunger 55 is disposed inside the female coupler body 51 to be slidable in the axial direction with a predetermined range. A second elastic member 56 is disposed between the first plunger 55 and the female coupler body 51.

The second elastic member 56 may be a compression spring, and provides elastic force so that the first plunger 55 moves forwards in the axial direction relative to the female coupler body 51. In this instance, the forward movement direction of the first plunger is the right direction of FIG. 1. A supporter 513 is joined to the inside of the female coupler body 51 in order to support one side of the second elastic member 56.

Additionally, the first plunger 55 has a communication hole 552. In a state where the first plunger 55 moves forwards maximally, an internal passage of the female coupler body 51 is closed by the first plunger 55. When the first plunger 55 moves backwards, the internal passage of the female coupler body 51 is opened by the communication hole 552. An O-ring 511 is disposed on the inner circumferential surface of the female coupler body 51 to seal the female coupler from the male coupler 10.

The male coupler body 11 has a coupling groove 115 inwardly formed on the outer circumferential surface thereof. The coupling groove 115 extends along the outer circumferential surface of the male coupler body 11. The second plunger 12 is disposed inside the male coupler body 11 to be slidable in the axial direction within a predetermined range. A third elastic member 13 is disposed between the second plunger 12 and the male coupler body 11. The third elastic member 13 may be a compression spring, and provides elastic force so that the second plunger 12 moves forwards in the axial direction relative to the male coupler body 11. In this instance, the forward movement direction of the second plunger is the left direction of FIG. 1. A supporter 111 for supporting one side of the third elastic member 13 is joined to the inside of the male coupler body 11.

Moreover, the second plunger 12 has a communication hole 122. In a state where the second plunger 12 moves forwards maximally, an internal passage of the male coupler body 11 is closed by the second plunger 12. When the second plunger 12 moves backwards, the internal passage of the male coupler body 11 is opened by the communication hole 122. An O-ring 121 is disposed between the second plunger 12 and the male coupler body 11. In a state where the male coupler 10 is completely inserted into the female coupler 50, an end portion 116 of the male coupler body gets in contact with a support part 516 of the female coupler body, an end portion 517 of the female coupler body gets in contact with a support part 117 of the male coupler body, and the first plunger 55 and the second plunger 12 push each other so that the internal passages communicate with each other.

Figure 2:
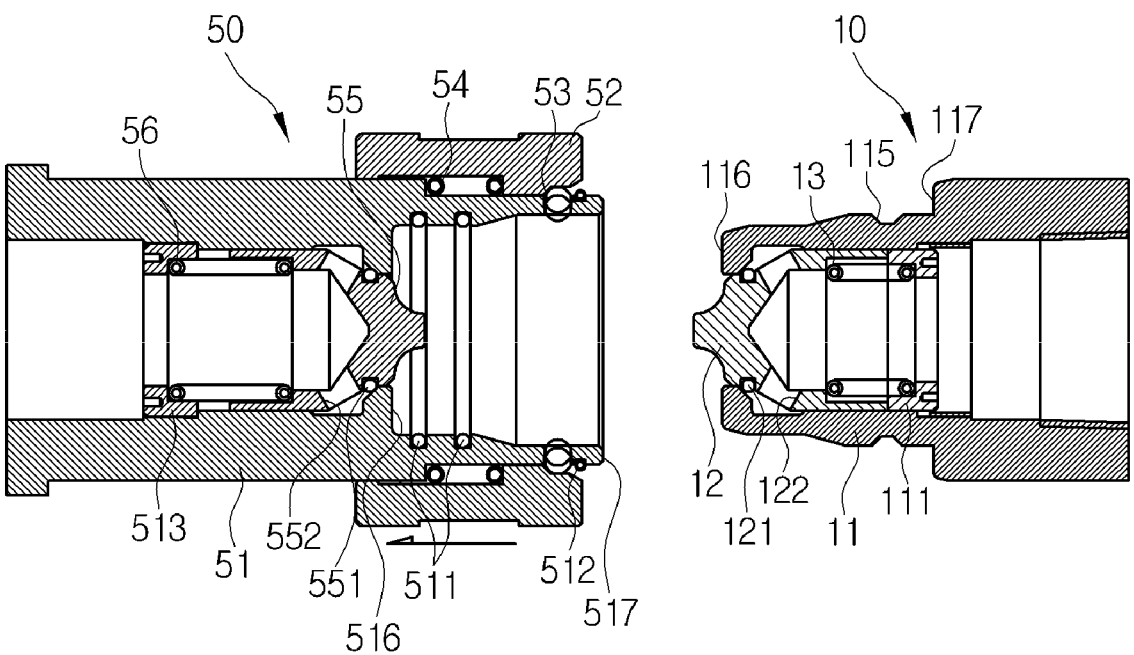
FIGS. 2 to 5 are views showing an operational process of a male coupler and a female coupler according to the preferred embodiment of the present invention.
Figure 3:
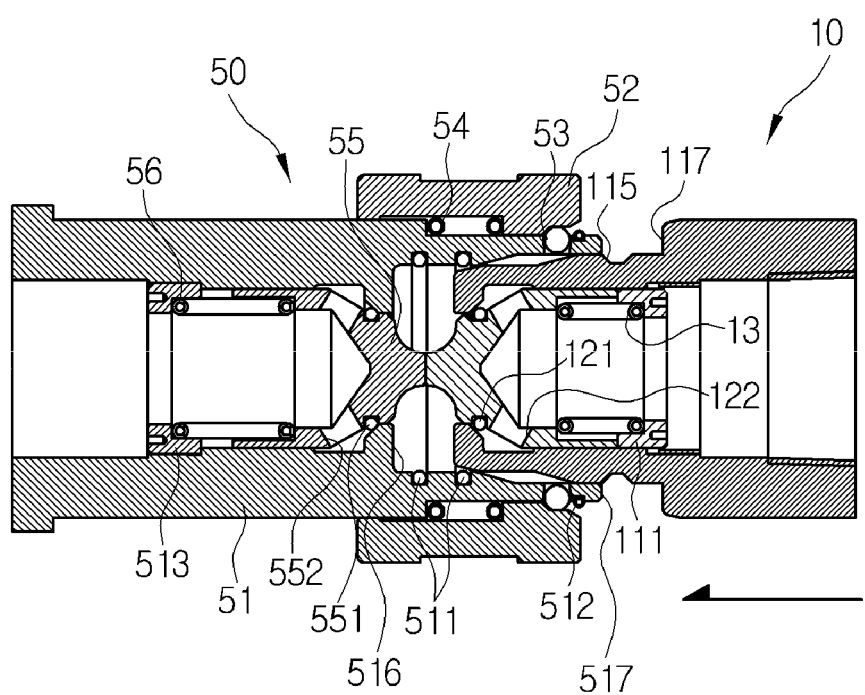

Now, a coupling process of a quick coupler according to a preferred embodiment of the present invention will be described. Referring to FIG. 2, first, the sleeve 52 of the female coupler 50 is moved backwards so that the balls 53 can move freely. Referring to FIG. 3, in the state of FIG. 2, the male coupler 10 is inserted into the female coupler 50. The first plunger 55 and the second plunger 12 push each other starting from the position of FIG. 3 so that the passages start to communicate with each other.

Figure 4:
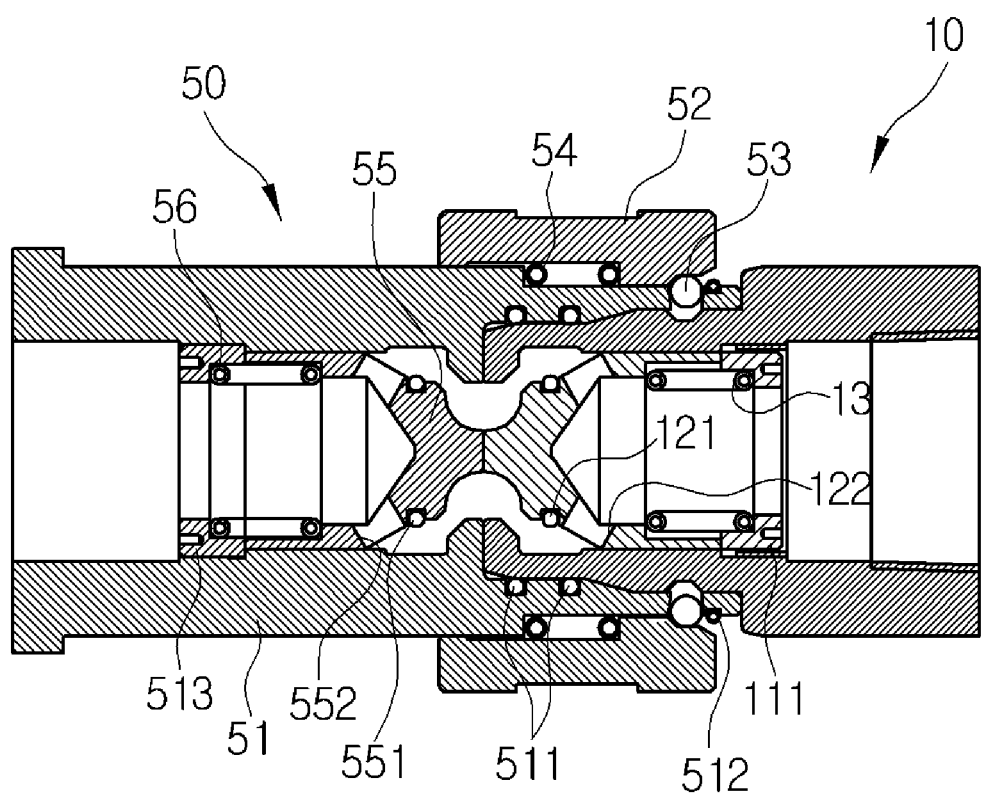
Figure 5:
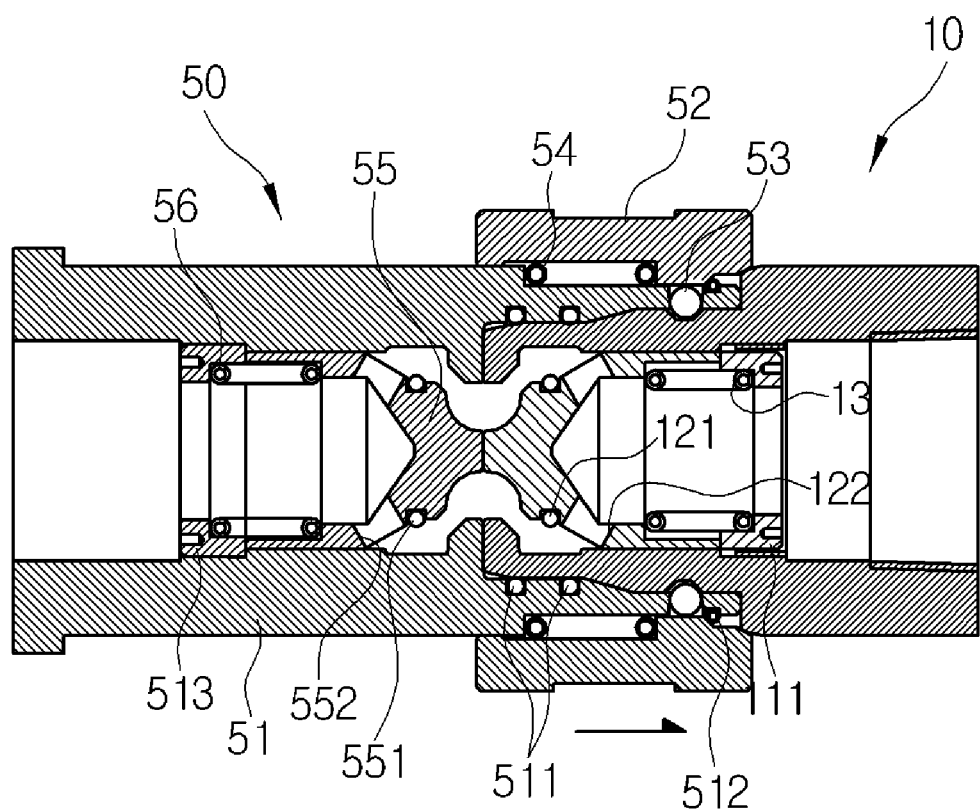
Figure 6:
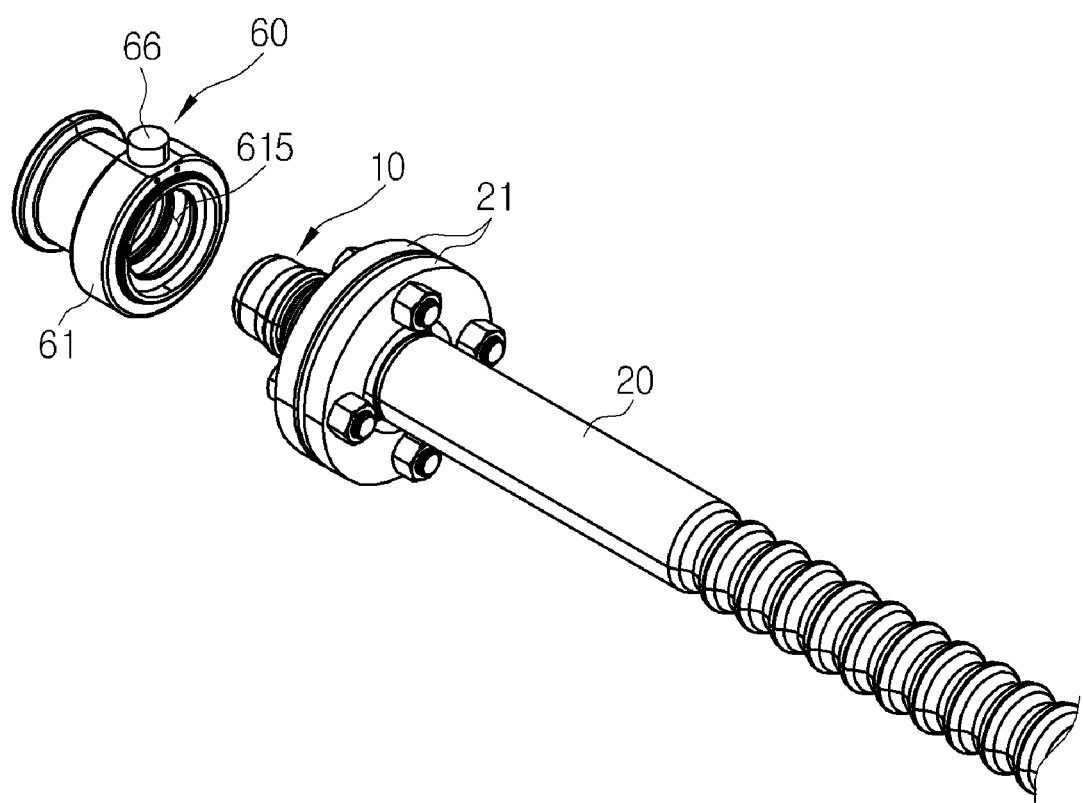
FIG. 6 is a rear perspective view showing a separated state of a coupler cap and the male coupler according to a preferred embodiment of the present invention.
Figure 7:
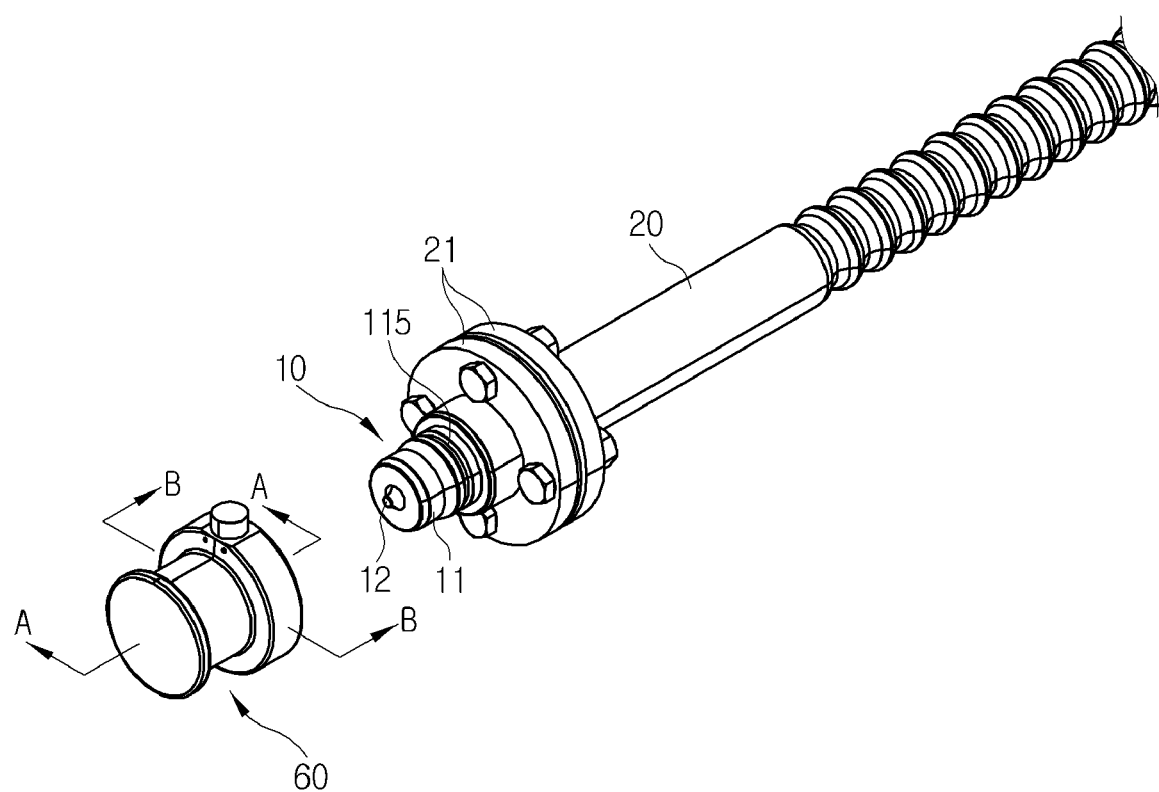
FIG. 7 is a front perspective view showing the separated state of the coupler cap and the male coupler according to the preferred embodiment of the present invention.
Figure 8:
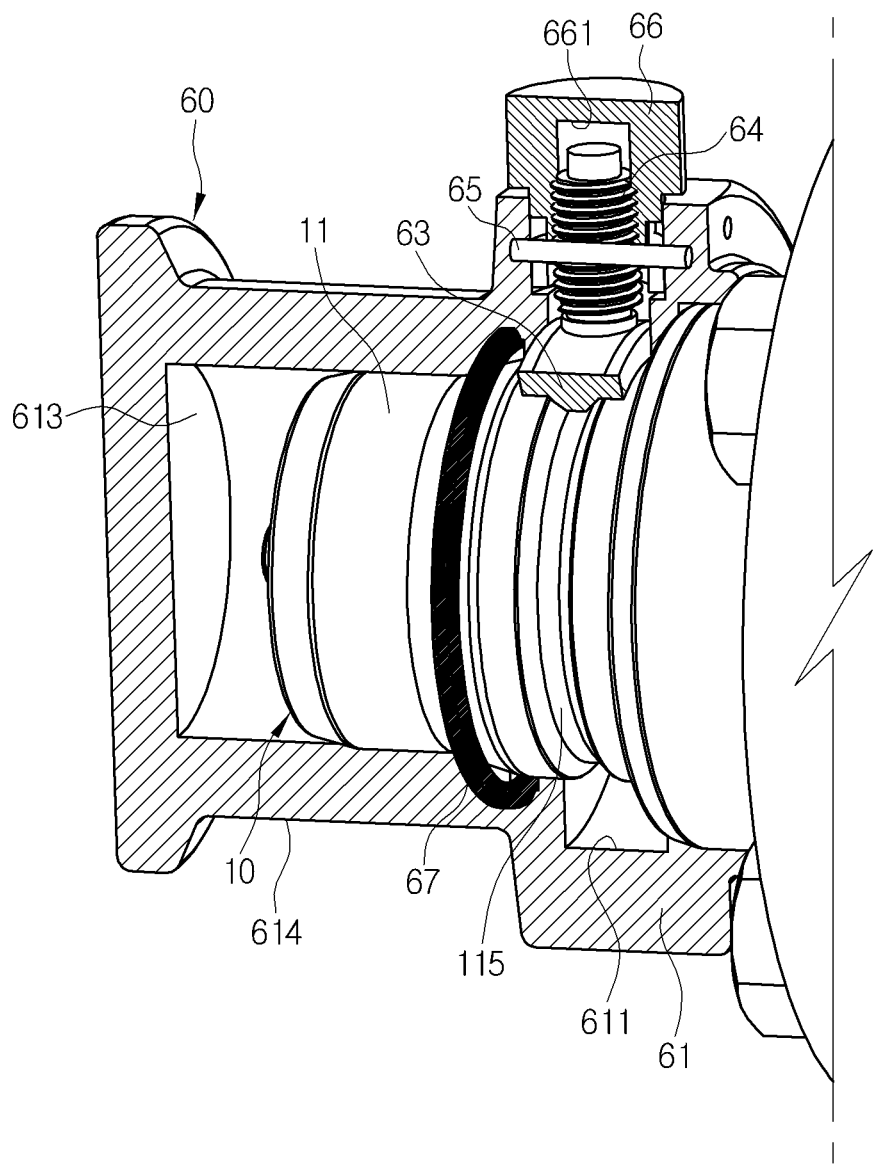
FIG. 8 is a cutaway perspective view showing a coupled state between the coupler cap and the male coupler according to the preferred embodiment of the present invention.

After that, as shown in FIG. 4, the male coupler 10 is completely inserted into the female coupler 50 so that the end portion 116 of the female coupler body gets in contact with the support part 516 of the female coupler body. Referring to FIG. 5, when the sleeve 52 of the female coupler 50 is moved forwards, the balls 53 are joined to the coupling groove 115 of the male coupler 10. The balls 53 lock the female coupler 50 and the male coupler 10 between the female coupler 50 and the male coupler 10 in order to prevent the male coupler from being separated from the female coupler 50 in the axial direction and to maintain the coupled state of the female coupler 50 and the male coupler 10.

Referring to FIGS. 6 to 10, the male coupler 10 has a coupler cap 60. The male coupler 10 is coupled to a hose 20 through a flange 21, and the coupler cap 60 is coupled to an end portion of the male coupler 10. The coupler cap 60 can be decoupled from the male coupler 10.

The coupler cap 60 according to the embodiment of the present invention includes a cap body 61, a handle 66, pins 65, a screw bar 64, and a stopper 63.

The cap body 61 has a tube shape that one side is opened in the axial direction and the other side is closed in the axial direction. The cap body 61 has a receiving hole 615 formed in the opening part thereof so that the male coupler 10 is inserted into the cap body 61 in the axial direction. The cap body 61 has a ring-shaped groove 611 inwardly formed on the inner circumferential surface 616 thereof. The ring-shaped groove 611 extends along the inner circumferential surface of the cap body 61. The cap body 61 further includes an insert hole 619 formed in the outer circumferential surface thereof.

The insert hole 619 penetrates through the receiving hole 615 in the radial direction. In more detail, the insert hole 619 is formed to penetrate the outer faces of the ring-shaped groove 611 and the cap body 61. A fixing groove 614 is formed on the outer face of the cap body 61 in order to fix external devices, such as a storage box or the likes. The cap body 61 has an O-ring 67. The O-ring 67 is disposed between the outer circumferential surface of the male coupler 10 and the inner circumferential surface of the receiving hole 615 to provide sealing performance between the male coupler 10 and the cap body 61.

Furthermore, a support jaw 612 is formed on the inner face of the cap body 61 to get in contact with the support part 117 of the male coupler body when the male coupler 10 is inserted into the cap body 61. When the male coupler 10 is inserted into the coupler cap 60 to the end, the support part 117 of the male coupler body comes into contact with the support jaw 612 of the cap body 61 so that the male coupler 10 is no more inserted into the coupler cap 60. Therefore, the end portion of the male coupler 10 is isolated from an inner end portion 613 of the cap body 61 at a predetermined interval so that a predetermined space is formed between the end portion of the male coupler 10 and the inner end portion 613 of the cap body 61. That is, the second plunger 12 of the male coupler 10 does not touch the inner end portion 613 of the cap body 61 so as to prevent the coupler cap 60 from being polluted from chemicals.

The handle 66 is connected to the cap body 61 to be rotatable in the radial direction as an axial line. The handle 66 is inserted into the insert hole 619 to be rotatable in place. In the state where some of the handle 66 is inserted into the insert hole, and the other of the handle 66 protrudes out from the cap body 61. In order to prevent slip during rotation, protrusions, such as uneven parts or embossed parts, may be formed on the outer circumferential surface of the protruding part of the handle 66.

A pair of the pins 65 are formed at both sides of the handle 66. The pins 65 extend at right angles relative to the axial direction to rotatably support the handle 66. That is, the pins 65 are arranged between the outer circumferential surface of the handle 66 and the inner circumferential surface of the insert hole 619, and are extended in the axial direction of the coupler. The pins 65 are connected to be freely rotatable relative to the cap body 61, and the axial line direction of the pins 65 is aligned with the axial direction of the coupler.

Figure 11:
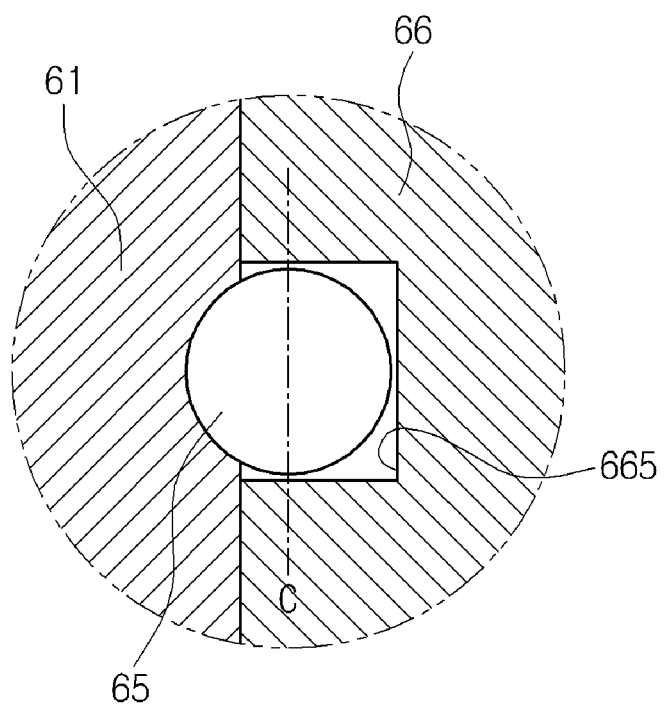
FIG. 11 is an enlarged sectional view of a part "C" of FIG. 10.

Referring to FIG. 11, a retaining groove 665 is inwardly formed on the outer circumferential surface of the handle 66 to be rotatably supported by the pins 65. The pins 65 are biased toward the handle 66 rather than the cap body 61 so that the axial line is located inside the retaining groove 665. That is, the central line (C) of the pin 65 is located further inside the retaining groove 665. Therefore, the handle 66 can be smoothly rotated in place between a pair of the pins 65 without separation.

One side of the screw bar 64 is joined to a stopper 63, and the screw bar 64 has a screw thread formed on the outer circumferential surface so as to be screw-coupled with the handle 66. The screw bar 64 is a round bar, and has the screw thread formed on the outer circumferential surface in the axial direction. An inner end portion of the handle 66 is opened in the radial direction, and an outer end portion is closed. A spiral groove is formed at the inner end portion of the opened handle 66 so that the screw bar 64 is screw-coupled with the handle 66. The screw bar 64 is crew-coupled with the spiral groove of the handle 66, and is moved rectilinearly in the axial direction of the handle, namely, in the radial direction of the coupler, by rotation of the handle 66.

The stopper 63 is moved rectilinearly in the radial direction of the cap body 61 by rotation of the handle 66. The stopper 63 is joined to the end portion of the screw bar 64 in the axial direction of the handle, so that the screw bar 64 and the stopper 63 are moved together rectilinearly when the handle 66 is rotated. That is, the stopper 63 is inserted into the ring-shaped groove 611 of the cap body 61, and moves rectilinearly in the radial direction of the coupler inside the ring-shaped groove 611. When the handle 66 is rotated, the stopper 63 is prevented from being rotated by the ring-shaped groove 611 and is guided in rectilinear movement.

Furthermore, the stopper 63 has a protrusion part 631 formed at an end portion thereof. The protrusion part 631 is formed to be inclined at both sides to get narrower toward the end portion. Additionally, the coupling groove 115 of the male coupler 10 is formed to correspond to the shape of the protrusion part 631 to get in contact with the protrusion part 631. Therefore, when the stopper 63 moves toward the coupling groove 115 of the male coupler 10, the end portion of the protrusion part 631 goes toward the coupling groove 115 while being guided within a range of the width of the coupling groove 115, so that the stopper 63 is automatically aligned relative to the coupling groove 115 of the male coupler 10. Finally, even though a fine gap is formed between the male coupler 10 and the coupler cap 60 in the axial direction, the male coupler 10 and the coupler cap 60 can be coupled smoothly.

In the meantime, the stopper 63, the screw bar 64 and the handle 66 are formed singly. Therefore, the present invention can reduce the number of components, lower manufacturing costs, and improve assemblability. In this instance, the stopper 63, the screw bar 64 and the handle 66 may be formed in the plural to be arranged along the circumference of the coupler cap 60. However, the coupler cap 60 according to the embodiment of the present invention has the stopper 63, the screw bar 64 and the handle 66 disposed singly, thereby reducing the number of components, having highly structural intensity, enhancing coupling force between the male coupler 10 and the coupler cap 60, and maintaining the stable coupled state.

Meanwhile, the handle 66 has a stop part 661. The stop part 661 serves to restrict the rectilinear movement width of the screw bar 64 since the end portion of the screw bar 64 comes into contact with the stop part 661. When the handle 66 is rotated in the clockwise direction, the stopper 63 is drawn out from the ring-shaped groove 611 and is joined to the coupling groove 115 of the male coupler 10. When the handle 66 is rotated in the counterclockwise direction, the stopper 63 is inserted into the ring-shaped groove 611 so that the male coupler 10 is freely inserted into the coupler cap 60. When a worker adjusts the depth of the stop part 661 of the handle 66, the rectilinear movement width of the stopper 63 can be controlled.

Figure 12:
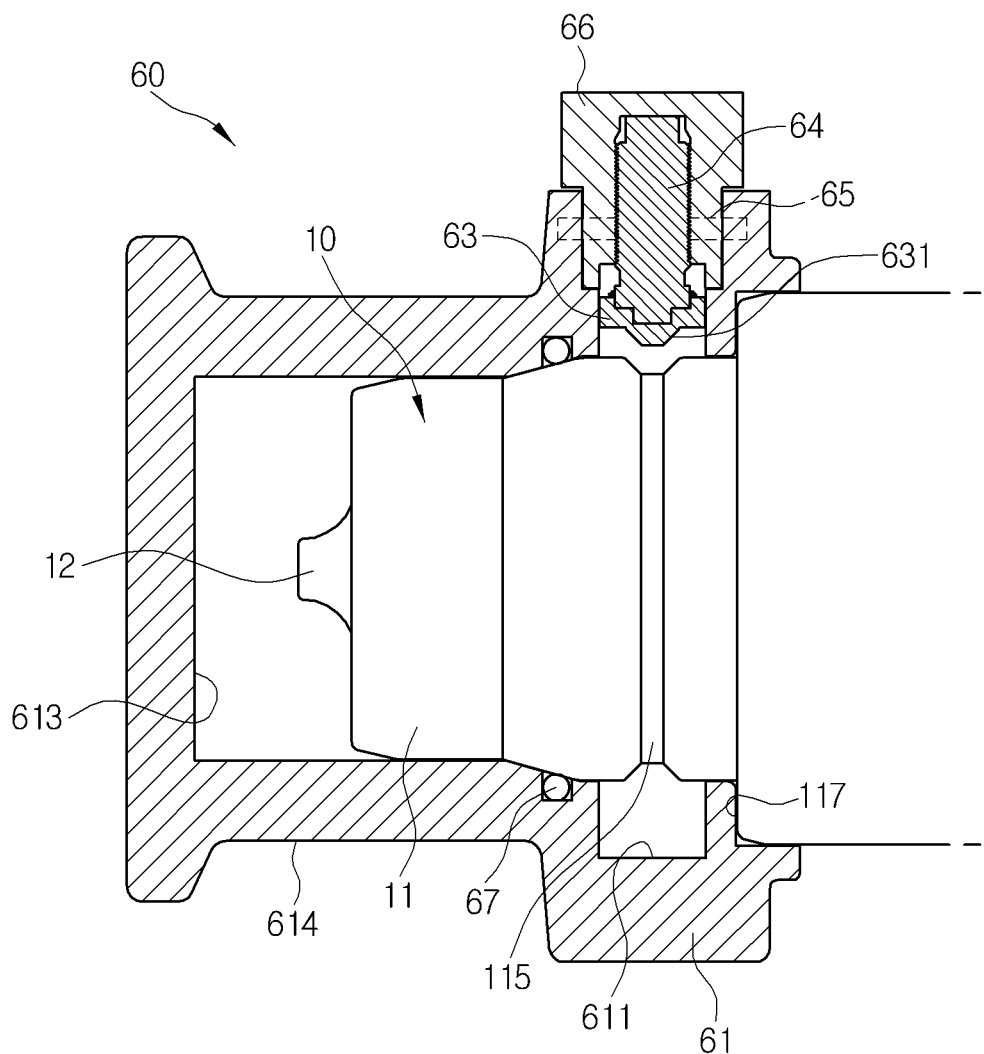
FIGS. 12 and 13 are views showing an operational process of the coupler cap and the male coupler according to the preferred embodiment of the present invention.

Referring to FIG. 12, when the handle 66 is rotated in the counterclockwise direction maximally, the screw bar 64 gets in contact with the stop part 661. The stopper 63 is perfectly hidden into the ring-shaped groove 611 so that the male coupler 10 can be freely inserted into the coupler cap 60. When the male coupler 10 is inserted into the coupler cap 60 to the end, the support part 117 of the male coupler body gets in contact with the support jaw 612 of the cap body 61, so that the male coupler 10 is no more inserted into the coupler cap 60. The second plunger 12 of the male coupler 10 is isolated from an inner end portion 613 of the cap body 61 at a predetermined interval not to touch the inner end portion 613 of the cap body 61, and the male coupler 10 and the coupler cap 60 are sealed from each other by the O-ring 67.

Figure 13:
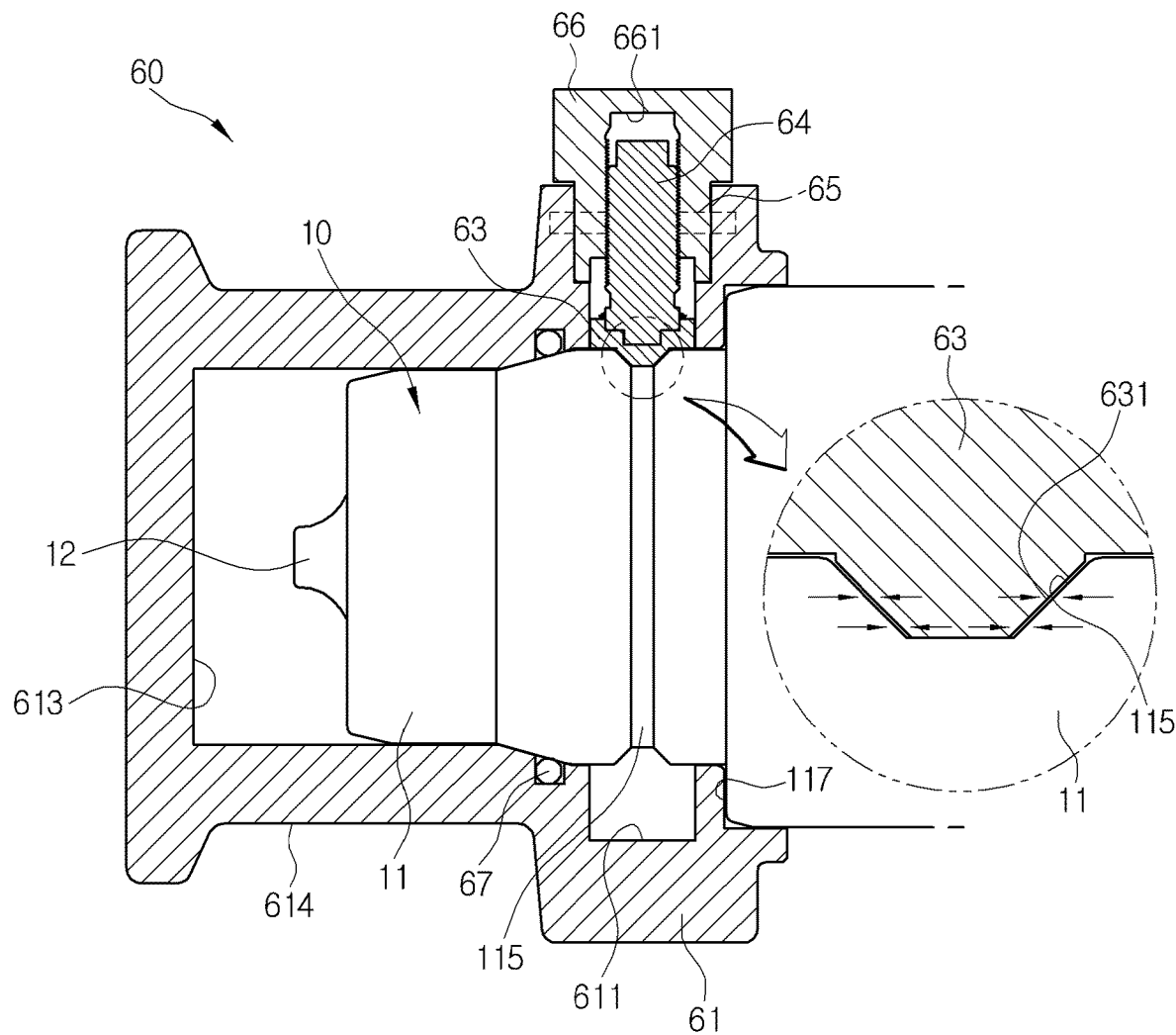

Referring to FIG. 13, when the handle 66 is rotated in the clockwise direction, the screw bar 64 and the stopper 63 are moved rectilinearly toward the coupling groove 115 of the male coupler 10. In the state where the male coupler 10 is inserted into the cap body 61 to the end, when the handle 66 is rotated in the clockwise direction maximally, the stopper 63 is joined to the coupling groove 115 so as to lock the male coupler 10 in the axial direction relative to the cap body 61. In this instance, in the state where the protrusion part 631 of the stopper 63 is perfectly inserted into the coupling groove 115, the coupled state of the cap body 61 and the male coupler 10 is maintained by shearing force acting in the axial direction of the cap body 61 as represented by an arrow.

The coupling groove 115 of the male coupler 10 is essentially required for coupling with the female coupler 50. The present invention does not have additional coupling means for coupling the coupler cap 60 but utilizes the coupling groove 115 of the male coupler 10 as it is so as to provide a stable and high coupling force.

As described above, while the present invention has been particularly shown and described with reference to the example embodiments thereof, it will be understood by those of ordinary skill in the art that the foregoing is illustrative of the present invention and various changes, modifications and equivalents may be made in the present invention without departing from the technical scope and idea of the present invention. Therefore, the technical protection scope of the present invention must be determined by the spirit of the appended claims.

What is claimed is:

1. A coupler cap comprising:
   a cap body having one side which is opened and has a receiving hole so that a male coupler is insertable into the cap body in an axial direction, and another side which is closed;
   a handle connected to the cap body to be rotatable in a radial direction as an axial line; and
   a stopper movable rectilinearly in the radial direction of the cap body by rotation of the handle,
   wherein the stopper is joined to a coupling groove formed inwardly on an outer circumferential surface of the male coupler by the rotation of the handle in a state where the male coupler is inserted into the cap body, so as to lock the male coupler in the axial direction relative to the cap body, wherein an insert hole which penetrates through the receiving hole in the radial direction is formed in the cap body, and the handle is inserted into the insert hole to be rotatable in place, wherein a screw bar has one side joined to the stopper and a screw thread formed on an outer circumferential surface of the screw bar is screw-coupled with the handle, and wherein a pair of pins are formed at both sides of the handle and extend at right angles relative to the axial direction to rotatably support the handle.

2. The coupler cap according to claim 1, wherein the stopper has a protrusion formed at an end portion thereof, and coupling between the cap body and the male coupler maintained by shearing force acting in the axial direction of the cap body in a state where the protrusion is completely inserted into the coupling groove.

3. The coupler cap according to claim 2, wherein the protrusion is formed to be inclined at both sides to get narrower toward the end portion, and the coupling groove of the male coupler is formed to correspond to the shape of the protrusion to get in contact with the protrusion.

4. The coupler cap according to claim 1, wherein the coupling groove extends along the outer circumferential surface of the male coupler, and the stopper and the handle are formed as a single piece.

5. The coupler cap according to claim 1, wherein the pins are arranged between an outer circumferential surface of the handle and an inner circumferential surface of the insert hole, wherein a retaining groove is formed on the outer circumferential surface of the handle to be rotatably supported by the pins, and wherein the pins are biased toward the handle rather than the cap body so that the axial line is located inside the retaining groove.

6. The coupler cap according to claim 1, wherein the handle has a stop part which restricts a rectilinear movement width of the screw bar by getting in contact with the end portion of the screw bar.

7. The coupler cap according to any one among claim 1, wherein an O-ring for sealing between the male coupler and the cap body is disposed between the outer circumferential surface of the male coupler and an inner circumferential surface of the receiving hole.

8. A coupler cap comprising:
a cap body having one side which is opened and has a receiving hole so that a male coupler is insertable into the cap body in an axial direction, and another side which is closed;
a handle connected to the cap body to be rotatable in a radial direction as an axial line; and
a stopper movable rectilinearly in the radial direction of the cap body by rotation of the handle,
wherein the stopper is joined to a coupling groove formed inwardly on an outer circumferential surface of the male coupler by the rotation of the handle in a state where the male coupler is inserted into the cap body, so as to lock the male coupler in the axial direction relative to the cap body,
wherein an insert hole which penetrates through the receiving hole in the radial direction is formed in the cap body, and the handle is inserted into the insert hole to be rotatable in place,
wherein a screw bar has one side joined to the stopper and a screw thread formed on an outer circumferential surface of the screw bar is screw-coupled with the handle,
wherein a ring-shaped groove is inwardly formed on an inner circumferential surface of the cap body, and the stopper is inserted into the ring-shaped groove, and
wherein the stopper is prevented from rotation by the ring-shaped groove and is guided in rectilinear movement when the handle is rotated.

* * * * *